Patented Sept. 29, 1953

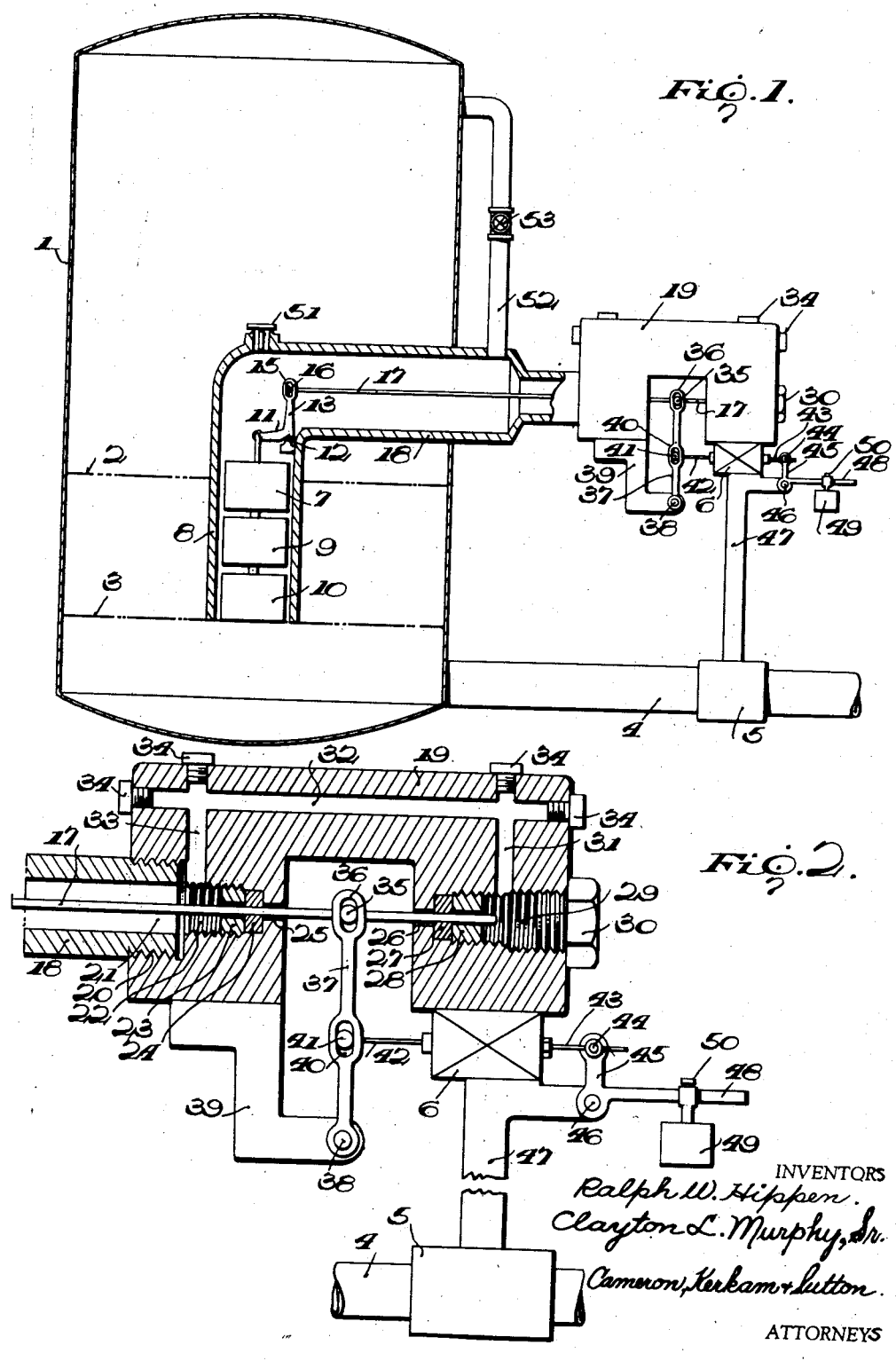

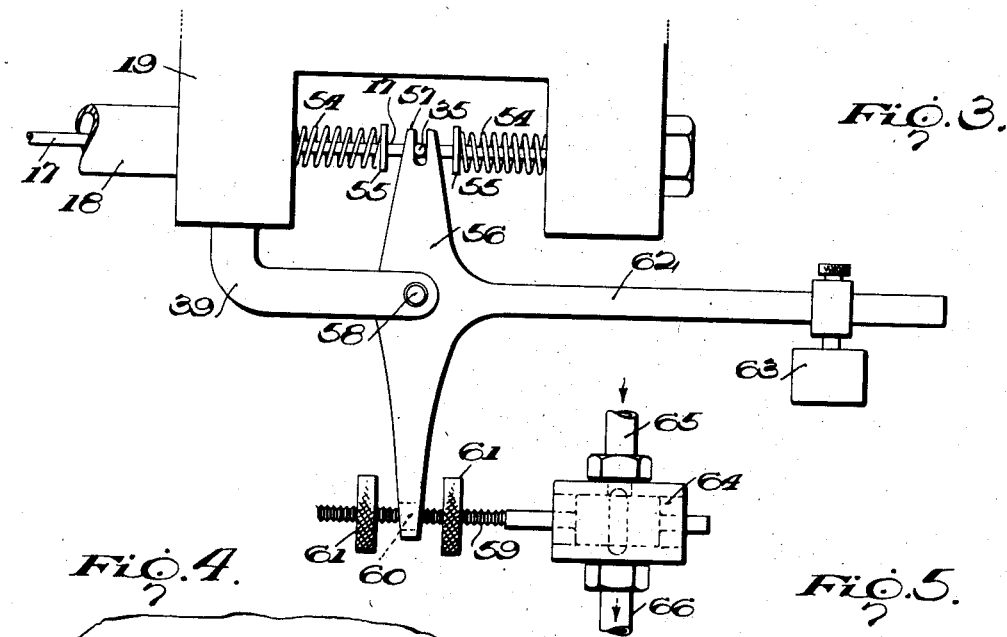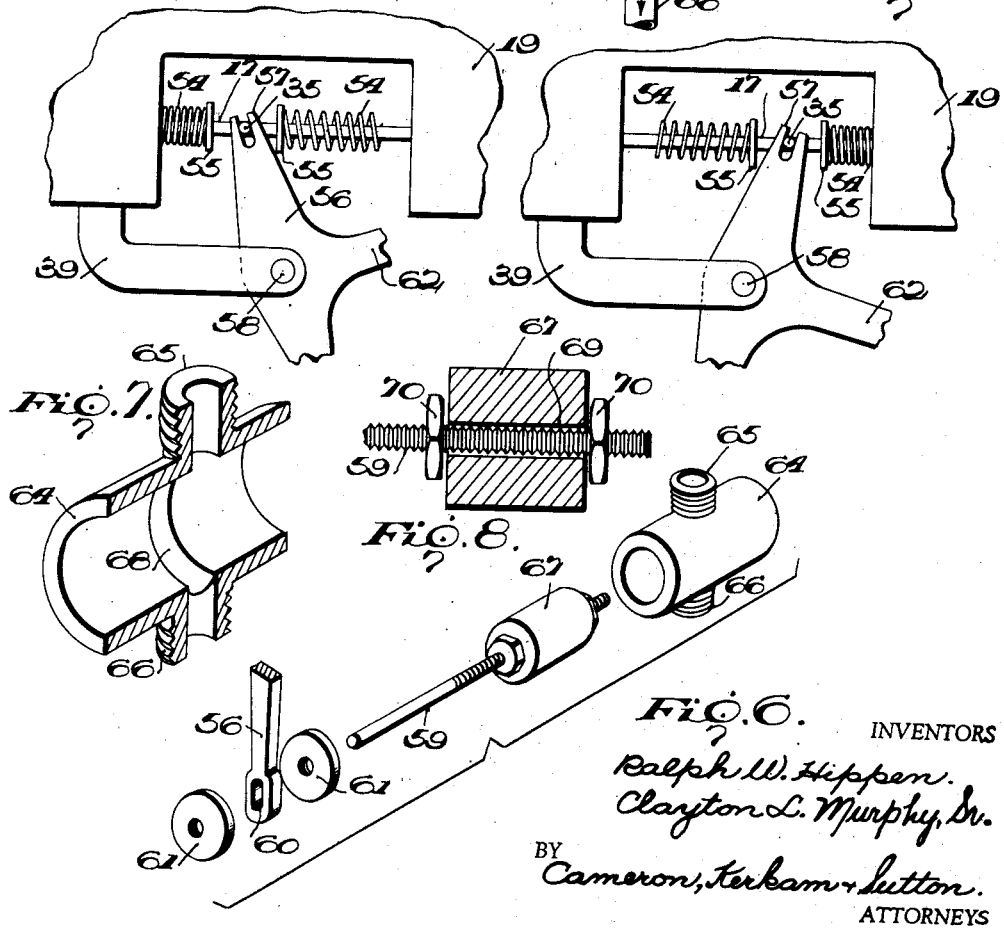

2,653,623

UNITED STATES PATENT OFFICE 2,653,623

LIQUID LEVEL CONTROL

Ralph William Hippen, Bellaire, and Clayton Lee Murphy, Sr., Houston, Tex.

Application January 23, 1950, Serial No. 140,138

16 Claims. (Cl. 137—413)

This invention relates to the control of liquid levels and more particularly to means actuated by an element that is influenced by variations of the level of the liquid in a tank or other vessel for maintaining said level between predetermined upper and lower limits.

Various types of liquid level control means have been devised heretofore, utilizing either an actual float which rises and falls with the liquid level, or an element having an effective specific gravity greater than that of the liquid and operating by virtue of the difference in its effective weight when partially or entirely submerged. Actuating elements of both types, which are designated generically hereinafter as buoyant elements, have been used to operate valves or other means for controlling the amount of liquid in a vessel. For example, in the case of closed vessels such as surge tanks and liquid-gas separators, buoyant elements of the differential weight type frequently have been used in conjunction with torque tubes or flex tubes sealed in the vessel wall and projecting outside the vessel to operate a pilot valve. However, so much energy is dissipated in distorting the flex tube or torque tube that only a small amount of energy remains to operate the valve, and delicate adjustments are required even though a pilot valve is employed. This disadvantage is aggravated by the fact that the available force is a function of the size of the buoyant element which usually must be kept small for practical reasons. Furthermore, the motion in the flex tube or torque tube is continuous as the liquid rises and falls around the buoyant element, so that a small change in the liquid level is sufficient to actuate the pilot valve or other controlling mechanism and quite often a throttling motion in the valve results.

One of the objects of the present invention is to provide an improved liquid level control device wherein virtually all of the energy generated by the buoyant element is transmitted to and is available for the operation of the valve or other mechanism which controls the amount of liquid in the vessel.

Another object is to provide an improved device of the type characterized the operation of which can be made sensitive to minor variations in the liquid level in the vessel as in the case of prior devices of the type described above, or insensitive to such minor variations so that it does not take place until the liquid reaches a predetermined level.

A further object is to provide an improved device of the type characterized which automatically maintains the liquid level in the vessel between upper and lower limits, being actuated by rise of the level to its upper limit to cause said level to fall until its lower limit is reached, and vice versa.

Another object is to provide an improved device of the type characterized in which the buoyant element rises and falls with the level of the liquid in the vessel and which can be adjusted to maintain the upper and lower liquid levels very close together.

A still further object is to provide an improved device of the type characterized which is not actuated by variations in liquid level between said upper and lower limits, but is actuated suddenly when the liquid level reaches either limit.

Another object is to provide an improved device of the type characterized in which a relatively small buoyant element can be used to provide the force required to operate the controlling mechanism.

Still another object is to provide improved operating mechanism for transmitting the force generated by the buoyant element to the valve or other controlling mechanism.

Two embodiments of the invention have been illustrated somewhat diagrammatically in the accompanying drawings, but it is to be expressly understood that said drawings are for purposes of illustration only and are not to be construed as a definition of the limits of the invention, reference being had to the appended claims for this purpose.

In said drawings,

Fig. 1 is a diagrammatic layout showing the installation and operation of liquid level control means embodying the invention;

Fig. 2 is a sectional view illustrating details of the operating system;

Fig. 3 illustrates a second embodiment of the invention;

Figs. 4 and 5 illustrate different operating positions of the apparatus shown in Fig. 3; and Figs. 6, 7 and 8 illustrate a preferred type of pilot valve.

Referring first to Figs. 1 and 2, the tank or vessel 1 may be of any suitable size, shape and construction and may be used for any desired purpose; for example, it may be a liquid-gas separating vessel such as is commonly used in the oil industry. Suitable upper and lower liquid levels are indicated at 2 and 3 respectively, the space above the body of liquid being filled with air or gas at varying pressure in the case of a closed vessel. The amount of liquid in the vessel and hence the liquid level can be adjusted by any suitable means, here shown as a pipe 4 and a valve indicated diagrammatically at 5 and constituting either liquid inlet means or, as in the example to be described below, liquid outlet means. If desired, the valve 5 can be operated by a suitable pilot valve indicated diagrammatically at 6, which may be simply a two-way cock or a slide valve controlling fluid pressure which actuates the main valve 5, or a more complicated pilot valve system of the gas-bleed-off type such as used in present control practice. It will be understood, however, that the above details are not part of the invention, which can be used with various other types of apparatus and for any desired purpose.

The pilot valve 6 is operated by a buoyant element 7 of any suitable type which is suspended inside the vessel 1 in position to be partially or entirely submerged as the liquid rises from the level 3 to the level 2. As stated above, the buoyant element may be a float having less effective specific gravity than the liquid and rising and falling with the liquid level. For most purposes and as shown, however, it is preferable to use a buoyant element having greater effective specific gravity than the liquid and operating as a differential buoyancy mass, such as a leak-proof hollow vessel or a solid mass, such elements having the advantages of greater ruggedness and resistance to physical injury, as compared with floats. In the form shown, the buoyant element is suspended in a vertical tubular casing 8 for a purpose to be described, and for ease of installation and removal in such cases, the element may comprise a suitable number of sections, the sections 9 and 10 being joined together and to the section 7 in any suitable manner.

The motion of the buoyant element is transmitted to the outside of the vessel substantially without dissipation by means of a link or rod that is moved longitudinally by the buoyant element. Any suitable means can be employed for translating vertical movement of the buoyant element into longitudinal movement of the rod or link.

In the form shown, the buoyant element is suspended from a horizontal arm 11 of a bell crank lever supported in any suitable manner and here shown as pivoted at 12 on the tubular casing 8, preferably on a knife-edge which is hooded by the lever resting thereon so as to minimize the accumulation of foreign matter at the bearing surface. The other arm 13 of the bell crank lever has a slotted end 15 engaging a pin 16 on the end of a rod or link 17 which extends movably through the vessel wall and, in the case of closed vessels, is suitably sealed to the wall. For example, the tubular casing 8 has a horizontal extension 18 which projects through the wall of the vessel 1, a gas-tight and liquid-tight seal being made in any suitable manner between said casing section and the vessel wall.

Vertical movement of the buoyant element thus causes horizontal movement of the rod 17 the outer end of which operates the pilot valve 6. In case the vessel 1 is under pressure, said outer end is preferably enclosed in a casing or chamber in which it is subjected to the same pressure as the inner end of the rod within the vessel. In the form shown, the end of the casing section 18 is connected and suitably sealed to one leg of a U-shaped block 19, the end of the casing section 18 having threaded engagement at 20 in a bore 21. Said bore is reduced in diameter at 22 and internally threaded to receive a nut 23 having a central opening through which the rod 17 passes freely, said nut serving to compress suitable packing 24 into the end of the bore 22 and around the rod in tight engagement therewith. The rod passes out through a small bore 25 and across the open space between the legs of the U-shaped block 19, entering the other leg through a small bore 26, packing 27 and a nut 28 and terminating in a large bore or chamber 29 which is internally threaded to receive the nut 28 and also a closing plug 30.

The arrangement described above permits rectilinear reciprocation of the rod 17 without gas leaks and substantially without loss of energy except for friction, and leaves a section of the rod between the legs of the U-shaped block exposed for connection to the valve-operating lever mechanism to be described so that it is unnecessary to enclose the rod completely and also part of said lever mechanism connected thereto. At the same time the gas pressures on the opposite ends of the rod are balanced by providing the block with bored passages 31, 32 and 33 connecting the chamber 29 with the bore 22 and hence with the tubular casing section 18. The ends of the passages 31, 32 and 33 are sealed in any suitable manner as by means of threaded plugs 34.

The exposed section of the rod 17 can be connected to the pilot valve 6 by any suitable motion-transmitting means. In the form shown, a pin 35 on the rod engages in the slotted end 36 of a lever 37 which is mounted in any suitable manner, being shown as pivoted at 38 on an arm or bracket 39 secured to the block 19. A slot 40 formed in the lever 37 intermediate its ends receives the end 41 of a valve operating rod 42 which extends into the casing of the pilot valve 6 to operate the valve according to the movements of the buoyant element. When the latter is of the preferred type having greater effective specific gravity than the liquid, positive action in both directions is assured by suitably counterbalancing part of the mass of the buoyant element as by means of a spring or counterweight. For example, the rod 42 is extended so as to project at 43 from the other side of the pilot valve casing, and the extension 43 is pivotally connected at 44 to the end of one arm 45 of a bell crank lever pivoted at 46 on a supporting bracket 47. The other arm 48 of the bell crank lever carries a counterweight 49 which is adjustable along the length of the arm 48 and can be secured in the desired position by a set screw 50. It will be evident that the counterbalancing system should be adjusted so as to overcome the mass of the buoyant element when the liquid is at the level 2, and to be overcome by the mass of the buoyant element when the liquid is at the level 3.

As stated above, it is often desirable to render the system insensitive to variations in liquid level between the upper and lower limits 2 and 3. To this end the buoyant element may be suspended in a separate compartment within the vessel 1, the liquid within said compartment being maintained at the upper level 2 by the pressure of the gas above the liquid in the vessel 1 until the level in said vessel falls to the point 3 and uncovers a suitable opening through which the liquid in the compartment can escape. This method of operation also requires the provision of a one-way gas valve of any suitable type through which the gas in the top of the compartment can escape as the liquid rises to the level 2 in both the vessel and the compartment, but which closes to prevent passage of gas in the reverse direction into the compartment as the liquid level falls in the vessel.

In the illustrated embodiment, the tubular casing 8, 18 forms such a compartment, the lower level 3 being determined by the location of the lower end of the casing section 8. At the top of the horizontal casing section 18 is a suitable one-way or check valve 51 through which gas may escape from the casing to the vessel, but which closes to prevent passage of gas in the reverse direction. The valve may be spring or weight-loaded if desired to delay its opening and hence the buoyancy differential effect.

When desired, the effect of the casing 8 can be eliminated by connecting the casing to the vessel so that the gas pressures are maintained equal. In the form shown, this can be accomplished by a by-pass connection 52 controlled by a valve 53; also the tubular casing can be omitted.

The operation of the apparatus will be understood from the foregoing description. In summary, when the liquid in the vessel is at the level 3, the buoyant element is in its lowest position and the pilot valve 6 is set to operate the main valve 5 so as to cause liquid to accumulate in the vessel. The liquid thus raises in the vessel until it reaches a desired level such as that indicated at 2, gas being meanwhile prevented from escaping from the casing to the vessel due to the loading of the valve 51. As soon as the valve opens, however, the liquid in the casing rises rather rapidly to or nearly to the level 2 and the buoyancy differential effect results in the rapid shifting of the lever system by the counterweight 49 with a kind of snap action so as to shift the pilot valve 6 and main valve 5. The liquid level in the vessel then falls, but that in the casing section 8 is maintained by the gas pressure in the vessel until the liquid therein reaches the level 3 and uncovers the end of the casing. The liquid in the casing then runs quickly out until the level is the same in both the casing and the vessel, and the increased weight of the buoyant element rapidly overcomes the counterweight and shifts the pilot valve with snap action back to its first mentioned position.

It will be evident that in the above case the lower level 3 is determined by the location of the lower end of the casing 8 and the upper level by the loading of the valve 51, and that both can be predetermined as may be desired. When the valve 53 is opened, on the other hand, the effect of the casing 8 is eliminated and the buoyant element rises and falls with the liquid level in the casing which is the same as that in the vessel. The device is now sensitive to minor variations in liquid level and can be adjusted so that the level is maintained practically constant within very narrow limits; for example, the discharge of liquid through the valve 5 can be practically continuous and at substantially the same rate as that at which liquid is supplied to the vessel, the valve 5 operating as a throttling or modulating valve. The change from one method of operation to the other requires only the operation of the valve 53.

Figs. 3-8 show a different type of apparatus for operating the pilot valve in which the length of the stroke of the valve is increased in relation to the movement of the rod 17 and in which friction effects are minimized, these results being desirable especially when the valve 53 is open and close and exact juxtaposition of the limits 2 and 3 is to be maintained.

The arrangement of the rod 17, casing section 18 and block 19 are the same as shown in Fig. 2. However, compression springs 54 surround the rod 17 on either side of the pin 35, each spring being interposed between the adjacent leg of the block 19 and a collar 55 secured to the rod. The springs are preferably installed under light initial compression and tend to maintain the rod 17 in the central position shown in Fig. 3 in which the springs balance each other. When the rod moves to the left as shown in Fig. 4 or to the right as shown in Fig. 5, as the result of a change in the liquid level, one or the other spring 54 is compressed. When the liquid level changes in the opposite direction, the force of the compressed spring supplements that of the weight 7 or of the counterweight 49 to move the rod quickly back toward its neutral position without lag. In this way the friction drag of the bearing surfaces and especially of the packing 24 and 27 on the rod 17 is overcome even though very high pressures act against the packing.

The lever 56, which corresponds to the lever 37 of Fig. 2, has a forked end 57 engaging the pin 35 and is pivoted on the bracket 39 at a point 58 approximately at the midpoint of the lever. Accordingly the pilot valve, which is operated by the other end of the lever, has a larger movement for a given displacement of the rod 17 than it has in the arrangement of Fig. 2. The upper and lower levels at which the pilot valve is actuated can be adjusted by passing the valve rod 59 through an opening 60 in the end of the lever and providing adjustable stop nuts 61 threaded on the valve rod on either side of the lever. The lever is counterweighted by means of an arm 62 and an adjustable weight 63.

Figs. 6-8 show a form of pilot valve adapted for use in a gas-bleed-off system of control of the main valve 5 and especially designed to minimize frictional effects on the operating system. The valve casing 64 has an inlet 65 for gas under pressure and an outlet 66 for delivering the gas to the main valve 5 for operating the latter. The casing 64 is tubular and open at both ends, and a cylindrical piston or plug 67 is movable axially in the casing by the valve rod 59. An annular groove 68 is formed completely around the inner surface of the casing, connecting the inlet 65 and outlet 66 so that when the piston 67 covers the groove, gas under pressure is delivered to the valve 5, but as soon as the piston is moved to uncover the groove, the pressure in the valve 5 is relieved and the gas escapes through the open end of the casing 64. The movement of the piston needs to be only enough to cover and uncover the edge of the annular groove, and the liquid levels at which these actions occur are determined by the setting of the nuts 61.

Inasmuch as the groove 68 passes entirely around the plug or piston 67, gas pressures on the latter are balanced at all times, and do not cause binding of the piston in the valve casing. Any tendency of the piston to bind is further reduced by passing the valve rod 59 loosely through a slightly larger bore 69 in the piston, the rod carrying adjustable nuts 70 which are set so that they do not quite engage the ends of the piston. Hence the valve rod can wobble slightly in the piston, but the amount of such wobbling is not sufficient to permit the valve rod 59 to bear against the end of the slot 60 in the lever 56.

Thus the system illustrated by Figs. 3–8 operates smoothly and in complete harmony with the rise and fall of liquid in the vessel 1 as long as the valve 53 is open. The levels 2 and 3 are adjustable in accordance with the setting of the nuts 61, and can be adjusted and maintained very close together since the system is practically free of lag. When the valve 53 is closed, on the other hand, the "snap action" described above takes place when the liquid in the vessel reaches the level 2 or 3 and the main valve 5 operates as a shut-off valve without throttling characteristics, thus reducing the erosive effect of the liquid.

It will be understood that the invention is not restricted to the embodiment described above and illustrated in the drawings, nor to the details of the foregoing description, since various changes can be made in the form, details of construction and arrangement of the parts without departing from the spirit of the invention. Reference should therefore be had to the appended claims for a definition of the invention.

What is claimed is:

1. Apparatus for controlling the liquid level in a vessel comprising means forming a compartment within said vessel having a liquid outlet into said vessel at the minimum liquid level to be maintained and a gas outlet into said vessel above the maximum liquid level to be maintained, valve means for said gas outlet subjected to the gas pressure in said compartment and moved thereby to open position when a predetermined gas pressure is built up in said compartment for the escape of gases from said compartment to said vessel but closing to prevent passage of gases back into said compartment, a buoyant element in said compartment, means for controlling the amount of liquid in said vessel, and means connecting said buoyant element with said control means to operate the latter.

2. Apparatus as defined in claim 1, including a passage connecting said compartment with said vessel at a point above the liquid level therein and a valve for closing said passage.

3. Apparatus as defined in claim 1, said control means being external to said vessel and said operating connections including a longitudinally movable rod projecting outside said compartment and vessel, and means forming a seal around said rod and preventing escape of gas from said compartment and vessel.

4. Apparatus for controlling the liquid level in a vessel comprising means forming a compartment within said vessel having a liquid outlet into said vessel at the minimum liquid level to be maintained and a gas outlet into said vessel above the maximum liquid level to be maintained, valve means for said gas outlet subjected to the gas pressure in said compartment and moved thereby to open position when a predetermined gas pressure is built up in said compartment for the escape of gases from said compartment to said vessel but closing to prevent passage of gases back into said compartment, means outside said vessel for controlling the amount of liquid in said vessel, a longitudinally movable rod projecting through the wall of said vessel, means forming a seal around said movable rod, a buoyant element in said compartment, connecting means actuated by vertical movement of said element for moving said rod longitudinally, and connecting means actuated by longitudinal movement of said rod for moving said control means.

5. Apparatus as defined in claim 4, including a passage connecting said compartment with said vessel at a point above the liquid level therein and a valve for closing said passage.

6. Apparatus as defined in claim 4, including a chamber outside said vessel into which the end of said rod projects, and means forming a seal between the chamber wall and said movable rod, said chamber having communication with said compartment to equalize the pressure on the opposite ends of said rod.

7. Apparatus as defined in claim 4, said rod extending horizontally through the vessel wall, said first-named connecting means including means for translating vertical movement of said element into horizontal movement of said rod.

8. Apparatus as defined in claim 4, said buoyant element having an effective specific gravity greater than that of said liquid, and counterbalancing means tending to move said rod in a direction to lift said element, the force exerted on said rod by said counterbalancing means being less than the force exerted thereon due to the weight of said element when said liquid is at said minimum level and being greater than that due to the weight of said element when said liquid is at its maximum level.

9. Apparatus for controlling the liquid level in a vessel comprising a buoyant element therein, a valve outside said vessel for controlling the amount of liquid therein, a horizontal longitudinally movable rod projecting outside said vessel, motion-transmitting means connecting said element and rod and including means for translating vertical movement of said element into horizontal movement of said rod, said element having an effective specific gravity greater than that of said liquid, connecting means actuated by longitudinal movement of said rod for moving said valve, and counterbalancing means outside said vessel and tending to move said rod in a direction to lift said element, the counterbalancing force exerted on said rod being less than the force exerted thereon by said element when the liquid is at its minimum level and greater than the force exerted thereon by said element when the liquid is at its maximum level.

10. Apparatus as defined in claim 9, said counter-balancing means comprising a lever mechanism connected to said rod and having a substantially horizontal arm, and a counterweight adjustable longitudinally along said arm.

11. Apparatus for controlling the liquid level in a vessel comprising a buoyant element in said vessel, means outside said vessel for controlling the amount of liquid therein, a rod movable longitudinally through the vessel wall, means forming a seal between said wall and rod, motion-transmitting means actuated by vertical movement of said element for moving said rod longitudinally, resilient means tending to move said rod longitudinally in opposite directions and to restore it to neutral position when moved away from said position in either direction in response to the movement of said buoyant element, and connecting means actuated by longitudinal movement of said rod for operating said controlling means.

12. Apparatus as defined in claim 11, said controlling means comprising a pilot valve, said connecting means comprising a lever having one end connected to said rod, said pilot valve having an operating rod carrying spaced longitudinally adjustable stops and the other end of said lever being movable between and into engagement with said stops.

13. Apparatus as defined in claim 12, said pilot valve comprising a tubular casing having a circumferential groove, an inlet connection to and an outlet connection from said groove for passage of fluid through said valve to operate said controlling means, and a piston connected to said rod and movable axially in said casing in one direction to cover said groove and in the other direction to uncover said groove and establish communication between it and the atmosphere.

14. Apparatus as defined in claim 13, said piston having a bore of larger diameter than said rod, said rod passing freely through said bore and having retaining members at the ends of said piston, whereby said rod is capable of wobbling in said bore.

15. A pilot valve particularly adapted for the control of a device operated by fluid pressure and comprising a tubular casing having a circumferential groove in its inner surface, an inlet connection to and an outlet connection from said groove for passage of fluid through said valve, and a piston movable axially in said casing in one direction to cover said groove and complete the fluid passage between said inlet and outlet connections, said piston being movable in the opposite direction to uncover said groove and said casing having an opening to the atmosphere through which fluid from said groove escapes.

16. A pilot valve as defined in claim 15 including a piston rod, said piston having a bore of larger diameter than said rod through which said rod extends loosely, and stop members on said rod at each end of said piston for longitudinal movement of said rod and piston together in both directions, the distance between said stop members being greater than the length of the piston therebetween so that said rod is capable of wobbling in said bore.

RALPH WILLIAM HIPPEN.
CLAYTON LEE MURPHY, Sr.

References Cited in the file of this patent

UNITED STATES PATENTS

| Number | Name | Date |
|---|---|---|
| 45,437 | Richards | Dec. 13, 1864 |
| 66,018 | Gould | June 25, 1867 |
| 542,900 | Smith | July 16, 1895 |
| 1,778,114 | Mace | Oct. 14, 1930 |
| 1,796,537 | Rossiter | Mar. 17, 1931 |
| 1,911,785 | Bailey | May 30, 1933 |
| 2,023,560 | Wager | Dec. 10, 1935 |
| 2,447,591 | Messick | Aug. 24, 1948 |
| 2,587,401 | Spence | Feb. 26, 1952 |